3,682,902
SEMICARBAZIDE WITH SUBSTITUTED PHENYL GROUP AND N-HETEROCYCLIC RING

Harald Oertel, Odenthal, Ulrich Eholzer, Cologne, and Friedrich-Karl Rosendahl, Leverkusen, Germany, assignors to Farbenfabriken Bayer Aktiengesellschaft, Leverkusen, Germany
No Drawing. Continuation-in-part of abandoned application Ser. No. 676,082, Oct. 18, 1967. This application June 8, 1970, Ser. No. 44,537
Claims priority, application Germany, Nov. 16, 1966, F 50,689
Int. Cl. C07d 93/10, 87/38, 51/70
U.S. Cl. 260—243 B
6 Claims

ABSTRACT OF THE DISCLOSURE

A semicarbazide having the formula

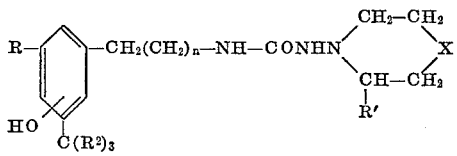

wherein
R is alkyl with 1 to 12 carbon atoms, preferably alkyl with 1 to 4 carbon atoms such as methyl or tertiary butyl;
$R^2$ is alkyl with 1 to 8 carbon atoms;
the —OH group is in the 2 or 4 position;
$n$ is an integer from 0 to 12, preferably 0 or 2;
$R'$ is hydrogen or alkyl with 1 to 4 carbon atoms and preferably methyl; and
X is a divalent inorganic radical, preferably >N—$NH_2$, —O—, or >$SO_2$.

Such compounds are useful to stabilize isocyanates against discoloration during storage.

RELATED APPLICATION

This application is a continuation-in-part of "Process for the Preparation of New Phenol Derivatives," Ser. No. 676,082, filed Oct. 18, 1967, by the present inventors, and abandoned June 9, 1970.

BIBLIOGRAPHY

The starting materials used to prepare the present compounds are described in U.S. 3,121,732.

It has now been found that new derivatives of phenol having the formula given in the abstract can be obtained by reacting an isocyanate of the formula:

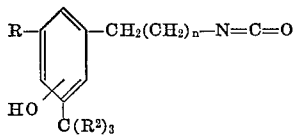

with an N-amino-heterocyclic amine of the formula:

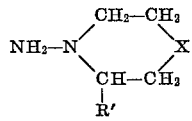

wherein R, $R^2$ $n$, $R'$ and X have the meanings given in the abstract. The reaction is preferably carried out in the presence of a solvent at a temperature of 0° to 200° C.

Suitable inert solvents are petroleum ether, tetrahydrofuran, dioxane, ethyl acetate, benzene or trichlorobenzene. Preferably equivalent quantities of each reactant are used. The reaction proceeds smoothly and rapidly usually without external heating and in some cases even below 0° C. One can, therefore, also use as solvents alcohols such as ethanol, isopropanol and preferably tert. butanol or methanol, when operating at the lower temperatures. The temperature range is 0° to 200° C., preferably 50 to 160° C.

Examples of useful N-amino heterocyclic amines are: N-aminopyrrolidone, N-aminopiperidine, and N-aminomorpholine. Bis-hydrazines such as N,N'-diamino-piperazine, or N,N'-diamino-2,5-dimethylpiperazine in which the N,N-dialkylhydrazine group occurs twice can also be reacted in the form of their biscarboxylic acid esters with 2 mols of the amines.

THE PRODUCT

The phenols obtainable by this process in which an N-heterocyclic-semicarbazide group is attached to the benzene nucleus via alkylene groups, are all colorless and in some cases crystalline compounds.

The new phenols have many applications. They are efficient polymerization inhibitors for unsaturated monomer compounds and can easily be removed therefrom, e.g. by salt formation. They are also suitable for use as additives for natural and synthetic fats or oils, and as fuels or lubricants. They also have a bactericidal action.

The present compounds are excellent stabilizers against discoloration of isocyanates upon storage. Thus, e.g. the addition of 20 p.p.m. in technical toluylenediisocyanate (2,4-/2,6-isomer ratio 65:35 or 80:20) of any of the compounds obtained as described in the examples prevents discoloration upon storage, whereas unstabilized toluylenediisocyanate upon storage (25° C.) assumes a yellow coloration after 100 days.

Example 1

57.8 g. of 3,5-di-tertiary-butyl-4-hydroxy-phenyl-propyl-γ-isocyanate in 125 ml. of tert. butanol are added dropwise with stirring within 10 minutes to 11.6 g. of N,N'-diamino-piperazine dissolved in 70 ml. of methanol. After recrystallizing the resulting semi-solid precipitate from ethanol and water, 55 g. of crystals of the melting point 262–264° C. (Kofler block) are obtained.

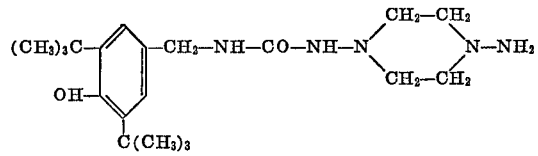

Example 2

57.8 g. of 3,5-di-tertiary-butyl-4-hydroxy-phenyl-propyl-γ-isocyanate and 20.4 g. of N-amino-morpholine are mixed at room temperature in a 25 percent methanolic solution. The crude product precipitated with water is recrystallized from benzene and yields 68 g. of colorless crystals of the melting point 182° C.

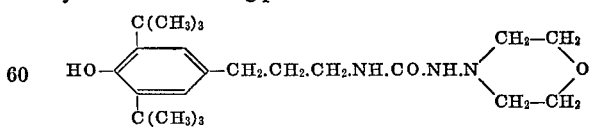

Example 3

A solution of 28.7 g. of 3,5-di-tertiary-butyl-4-hydroxyphenyl-propyl-γ-isocyanate in 125 ml. of tertiary butanol are added dropwise within 3 minutes to a solution of 15 g. of N-amino-tetrahydro-thiazine-S-dioxide in 100 ml. of ethanol. After heating to 50° C. for 1 hour part of the solvent is distilled off and the residue of the crystals (crude yield 25.9 g.) is recrystallized from alcohol and water.

The melting point of the colorless crystals is 203–204° C.

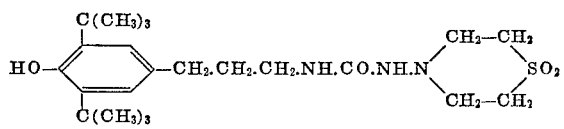

Example 4

A solution of 28.7 g. of 3,5-di-tertiary-butyl-4-hydroxyphenyl-propyl-γ-isocyanate in 125 ml. of methanol is added dropwise within a few minutes to a solution of 14.6 g. of N-amino of 2-methyl-tetrahydro-thiazine-S-dioxide in 100 ml. of hot methanol. After distilling off the major quantity of the solvent the residue is recrystallized from ethanol and water. The melting point of the colorless crystals is 196° C.

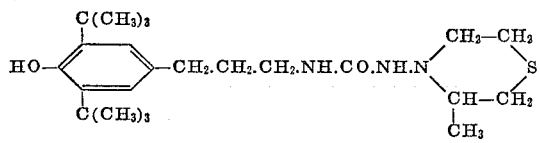

We claim:
1. Semicarbazide of the formula

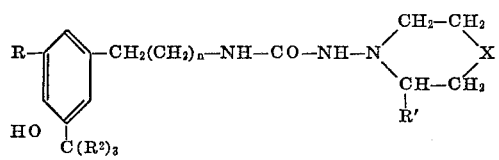

wherein

R is alkyl with 1 to 12 carbon atoms;
$R^2$ is alkyl with 1 to 8 carbon atoms;
the —OH group is in the 2 or 4 position;
$n$ is an integer from 0 to 12;
R' is hydrogen or alkyl with 1 to 4 carbon atoms; and
X is >N—$NH_2$, >O, or >$SO_2$.

2. Semicarbazide of claim 1 wherein

R is alkyl with 1 to 4 carbon atoms;
$n$ is 0 or 2; and
R' is hydrogen or methyl.

3. The semicarbazide of claim 1 having the formula:

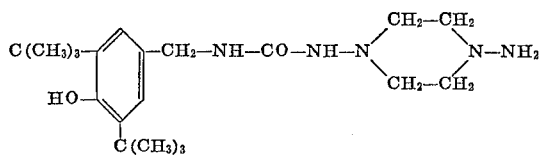

4. The semicarbazide of claim 1 having the formula:

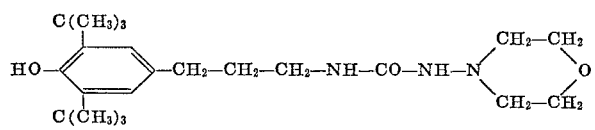

5. The semicarbazide of claim 1 having the formula:

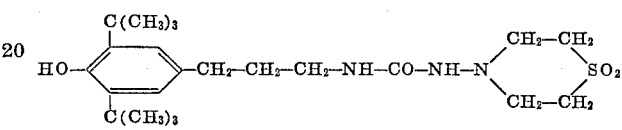

6. The semicarbazide of claim 1 having the formula:

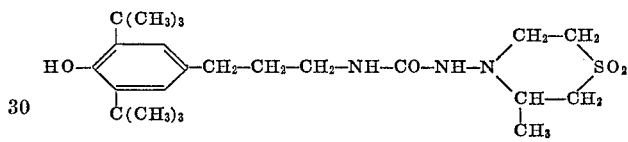

References Cited
FOREIGN PATENTS
1,080,454  6/1954  France ............ 260—268 N ALEX MAZEL, Primary Examiner R. J. GALLAGHER, Assistant Examiner U.S. Cl. X.R.

252—402; 260—247.2 A, 268 N, 453 AR